Dec. 25, 1962 J. C. LOGUE 3,070,779

APPARATUS UTILIZING MINORITY CARRIER STORAGE FOR SIGNAL STORAGE, PULSE RESHAPING, LOGIC GATING, PULSE AMPLIFYING AND PULSE DELAYING

Filed Sept. 26, 1955 3 Sheets-Sheet 1

INVENTOR.
JOSEPH C. LOGUE

BY [signature]

ATTORNEY

INVENTOR.
JOSEPH C. LOGUE
BY [signature]
ATTORNEY

Dec. 25, 1962 J. C. LOGUE 3,070,779

APPARATUS UTILIZING MINORITY CARRIER STORAGE FOR SIGNAL STORAGE, PULSE RESHAPING, LOGIC GATING, PULSE AMPLIFYING AND PULSE DELAYING

Filed Sept. 26, 1955 3 Sheets-Sheet 3

INVENTOR.
JOSEPH C. LOGUE

BY [signature]

ATTORNEY 3,070,779

APPARATUS UTILIZING MINORITY CARRIER STORAGE FOR SIGNAL STORAGE, PULSE RESHAPING, LOGIC GATING, PULSE AMPLIFYING AND PULSE DELAYING

Joseph C. Logue, Poughkeepsie, N.Y., assignor to International Business Machines Corporation, New York, N.Y., a corporation of New York Filed Sept. 26, 1955, Ser. No. 536,554
6 Claims. (Cl. 340—166)

The present invention relates to apparatus utilizing minority carrier storage in a semi-conductive body. This invention is adaptable to memory or data storage apparatus, and to other purposes including power amplification and logical circuits. It may be used as described herein in connection with either junction diodes or junction transistors. Many features of the invention may also be applied to other types of diodes and transistors.

When an electric current passes in the forward or low impedance direction through the boundary junction between regions of opposite conductivity types in a semi-conductive body, minority carriers flow through the junction into the region at the lower potential side of the junction. In the examples illustrated, "holes" are emitted from the P-region into the N-region. These holes have a finite lifetime which is dependent on the physical and chemical characteristics of the material of the N-region, and is independent of the continued flow of current.

If, during that lifetime, the forward flow of current is terminated and a reverse potential applied to the junction, the junction becomes a collector and there is initially a substantial flow of current in the reverse direction, until the holes have all been collected at the junction. This initial flow of current is of sufficient magnitude to be readily detected. It therefore offers a convenient means for determining whether or not a forward current was flowing through the junction just prior to the application thereto of the reverse potential. This hole storage phenomenon therefore forms a convenient device for storing data for a time not greater than the hole lifetime in the N-region.

Since the initial reverse current is, for a brief interval, substantially equal to the previously applied hole current (because the number of carriers is the same), and since that reverse current flows in a circuit of much greater impedance, it may be seen that there is power amplification between the input pulse which stores the holes and the output pulse which releases the holes from storage. The mechanism may therefore be utilized as a power amplifier.

Since, in such an arrangement, two conditions must be present to produce an output signal, namely an input signal current pulse flowing in one direction, and a sensing signal potential acting in another direction, the mechanism lends itself readily to the construction of logical circuits of the type wherein an output signal is produced only when two or more input conditions are present.

Since the basic mechanism is adaptable to both power amplifiers and logical circuits, it may be further adapted to produce more complex arrangements, as, for example, memory matrices.

An object of the present invention is to provide an improved memory device.

Another object is to provide a memory device involving the use of minority carrier storage in a semiconductive body.

Another object is to provide a power amplifier employing minority carrier storage of the type described.

Another object is to provide logical circuits employing minority carrier storage of the type described.

Another object is to provide a memory matrix employing minority carrier storage of the type described.

Another object is to provide a bistable circuit employing minority carrier storage.

Other objects and advantages of the invention will become apparent from a consideration of the following description and claims, taken together with the accompanying drawings.

*FIGURE 1*

Figure 2:
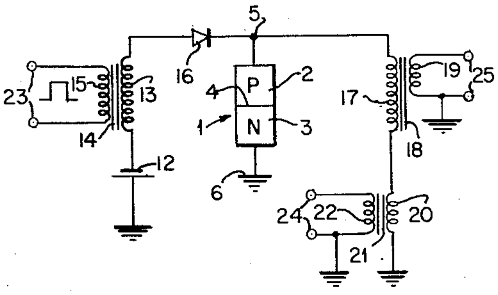
FIG. 2 is a wiring diagram of a modification of the circuit of FIG. 1, embodying additional features of the invention.

This figure illustrates a highly simplified circuit, and is presented in order to explain the essential principles of the invention in as simple a manner as possible.

This circuit includes a PN junction diode generally indicated by the reference numeral 1 and comprising a body of semi-conductive material including a P-region 2 and an N-region 3 separated by a boundary junction 4. The P-region 2 is connected to a terminal 5 and the N-region 3 is connected to a terminal 6.

An input circuit extends from terminal 5 through the diode 1 to terminal 6 and also includes a battery 7 and a switch 8. The polarity of battery 7 is arranged so that when the switch 8 is closed, the battery sends a current through the diode 1 in th forward direction, so that holes are emitted from the P-region 2 at the junction 4 and flow into the N-region 3.

An output circuit is also connected to the terminals 5 and 6, and includes a switch 9, a resistor 10 and a battery 11. The polarity of battery 11 is arranged so that when switch 9 is closed, the battery tends to send a current through the battery 1 in its reverse or high impedance direction. Suitable output terminals are connected to the opposite ends of the resistor 10.

Figure 1:
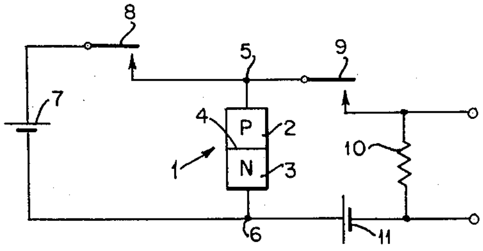
FIG. 1 is an electrical wiring diagram of a circuit embodying the invention and employing minority carrier storage in a diode.

*Operation of FIG. 1*

As mentioned above, when switch 8 is closed, minority carriers are stored in the N-region 3. If the switch 8 is opened and the switch 9 is thereafter closed, within the life-time of those minority carriers, then an initial current pulse flows through the output circuit including the resistor 10, providing a signal at the output terminals.

The input circuit is a low impedance circuit, and consequently may have a low potential battery 7. The only impedance in that circuit is the diode 1 which is connected in its low impedance direction. The output circuit, on the other hand, is a relatively high impedance circuit, since it includes the resistor 10 and the diode 1 in its high impedance direction. The battery 11 may therefore have a correspondingly high potential.

The magnitude of the initial output current pulse under the circumstances described above is determined by the number of minority carriers stored in the N-region 3. That number is in turn determined by the magnitude of the current pulse in the input circuit which stored the minority carriers. Consequently, the input current pulse and the output current pulse are substantially equal in magnitude. Since the output circuit is a high impedance circuit as compared to the input circuit, the power output is substantially greater than the power input, so that the circuit serves as a power amplifier.

Since a signal is produced at the output terminals only upon the occurrence of two different conditions in a particular relationship, i.e., the closure of switch 8 and its opening, followed by the subsequent closure of switch 9, the circuit of FIG. 1 may serve as a logical circuit. That is, an output signal from the circuit indicates that switch 8 is closed and opened and that switch 9 is subsequently closed. The output signal therefore indicates that both of these switching conditions have occurred. The circuit may therefore be said to be a non-coincident AND circuit. The term "AND" circuit is used to indicate that both the condition indicated by closure of switch 8 and the condition indicated by the condition of swtich 9 must occur to produce an output signal. This circuit is called a non-coincident circuit because the two conditions must not occur coincidentally but rather in a specific sequence.

The circuit of FIG. 1 may alternatively be considered as a data storage circuit, the time of storage being dependent on the lifetime of minority carriers in the N-region 3. A signal is stored or read into the N-region 3 by closing the switch 8. The signal so stored in the N-region 3 may be read out by closing switch 9 within the lifetime of the minority carriers after the switch 8 is opened. The output signal, or the absence thereof, which is obtained upon closure of the switch 9 tells whether or not the switch 8 was closed within that lifetime prior to closure of switch 9. The circuit may therefore be used to store a binary "bit" of information.

Although the diode 1 is shown as a PN junction diode it should be understood that other types of semi-conductor diodes could be used, as long as they have a region of extrinsic conductivity of a predetermined type, and an asymmetrically conductive junction in electrical contact with that region. For example, it might be a point contact diode or other structure having current amplifying characteristics in its reverse direction.

*FIGURE 2*

This circuit illustrates a modification of the circuit of FIG. 1, which includes more elaborate input and output arrangements. The circuit of FIG. 2 is illustrated as using the same diode 1 as in FIG. 1.

The input circuit of FIG. 2 may be traced from a ground connection through a biasing battery 12, the secondary winding 13 of an input transformer 14 having a primary winding 15, a blocking diode 16, terminal 5, diode 1 and grounded terminal 6.

The output circuit for FIG. 2 may be traced from grounded terminal 6 through diode 1, terminal 5, primary winding 17 of an output transformer 18 having a secondary winding 19, and secondary winding 20 of a reading signal transformer 21 having a primary winding 22, and thence to ground. Suitable signal input terminals 23 are connected to the primary winding 15 of input transformer 14. A source of suitable read signal potentials is connected through the read signal input terminals 24 to primary winding 22. Secondary winding 19 is connected to signal output terminals 25.

*Operation of FIG. 2*

The battery 12 biases the junction diode 1 and the blocking diode 16 in the reverse direction. In order to send a current pulse through those diodes, an input signal as it appears at the terminals of secondary winding 13 must have a polarity opposite to that of battery 10 and a potential greater than that of battery 10. When such an input signal is received, current flows through the input circuit and through the storage diode 1 from P-region 2 to N-region 3. In the N-region 3, or at least in that portion of the N-region close to the boundary junction 4, the current is represented chiefly by holes emitted from region 2 through the junction 4. At this time, there is substantially no current flow through the transformer windings 17 and 20, since those windings represent a high impeadnce as compared to the forward impedance of the diode 1, and the windings 17 and 20 are therefore short-circuited by the diode.

When the input signal current terminates, holes remain stored in the N-region 3 for the lifetime of minority current carriers in the region 3. This lifetime is a function of the physical and chemical characteristics of the material of which the N-region is made, being typically a time of the order of several microseconds.

If, within that lifetime after the termination of the input signal, a sensing or read out signal is received at the terminals 24, having a polarity tending to send current through the diode 1 in a reverse direction, then a substantial initial current will flow through the diode, that initial current being carried by the stored holes. The resulting current flow through primary winding 17 produces a substantial output signal at output terminals 25. Transformer 18 is a step-down transformer, so that the current in its secondary winding 19 is larger than the current in the primary winding 17. A current amplification is thereby secured. Like the circuit of FIG. 1, the circuit of FIG. 2 has a high impedance output branch and a low impedance input branch, so that it has power amplification. By the provision of the step-down transformer 18, the circuit of FIG. 2 is arranged to have not only power amplification but current amplification.

As in the case of the circuit of FIG. 1, the circuit of FIG. 2 may serve either as an amplifier, a logical circuit, or a data storage circuit.

The biasing battery 12 has the effect of cleaning up any holes which may exist in the N-region 3 in the absence of an input signal and therefore improves the distinction at the output terminals 25 between the On or positive output signal occasioned by the storage of holes in the region 3 and the Off or negative output signal condition, indicating the absence of stored holes.

Figure 3:
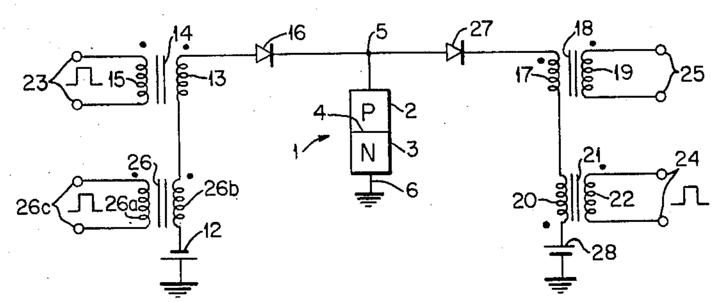
FIG. 3 is a wiring diagram of a circuit embodying a further modification of the invention.
Figures 4, 5:
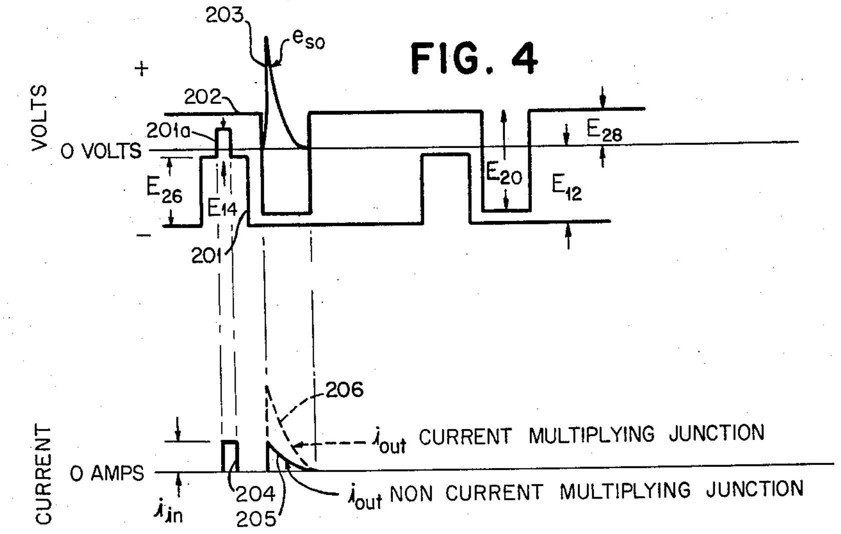
FIG. 4 is a graphical illustration of certain potentials in the circuit of FIG. 3.
FIG. 5 is a graphical illustration of certain currents in the circuit of FIG. 3, corresponding to the potentials of FIG. 4.

*FIGURES 3 to 5*

There is shown in FIG. 3 a circuit embodying the principles of the invention and based on the circuits of FIGS. 1 and 2, but considerably more elaborate. Those circuit elements in FIG. 3 which correspond fully in structure and function to their counterparts in FIGS. 1 and 2 have been given the same reference numerals and will not be further described in detail.

As compared with FIG. 2, there has been added to the input circuit of FIG. 3 a read in input transformer 26 having a primary winding **26*a* and a secondary winding 26*b* connected in series with the input circuit. The primary winding 26*a* is connected to read in signal input terminals 26*c***.

There are provided in the output circuit of FIG. 3 a blocking diode 27 and a battery 28 poled to bias that blocking diode 27 reversely.

FIG. 4 illustrates the potential conditions occurring at various points in the circuit of FIG. 3. The line 201 indicates the potential appearing between ground and the upper terminal of secondary winding 13 in FIG. 3. This is a composite potential having three components, shown in FIG. 4 as the component $E_{12}$ due to the biasing battery 12, a component $E_{26}$, due to the read in signal and a component $E_{14}$ due to the input signal.

The line 202 shows the potential variation between ground and the upper terminal of the secondary winding 20, where the read out or sensing signals appear. The line 203 indicates the potential appearing at the output terminals 25. Line 202 is a composite potential including as components a potential $E_{28}$, representing the potential of the biasing battery $E_{28}$ and a potential $E_{20}$ representing the sensing or read out pulse.

FIG. 5 shows at 204, the current input pulse which flows when the line 201 of FIG. 4 becomes positive. There is shown at 205 in FIG. 5 the current output pulse which appears in the secondary winding 19 when the output potential 203 of FIG. 4 becomes positive. The curve 205 is drawn for a non-multiplying junction in the diode 1, such as the PN junction 4. If a diode having a current multiplying junction is used in place of the diode 1, then the output current pulse appears as shown in the dotted line curve 206 of FIG. 5.

*Operation of FIG. 3*

The operation of this circuit should be clear from a study of FIGS. 4 and 5. Briefly, the read in signal through transformer 26 is applied at spaced intervals. The readout signal is applied at input terminals 24 at similarly spaced intervals, except that each read out signal pulse is presented just after each read in pulse terminates. If an input signal is received at terminals 23 during a read in pulse, then the potential across the diode 1 becomes positive, as shown at 201*a* in FIG. 4 and a current pulse 204 flows through the diode 1, storing holes in the N region 3.

As soon as the read in pulse terminates, the read out pulse is applied and the resulting current flows in the reverse direction through diode 1, shown at 205 in FIG. 5, producing an output signal potential 203 across the transformer primary winding 17, thereby producing a signal at the output terminals 25.

In the operating cycle shown in the right-hand portions of FIGS. 4 and 5, no input signal is received at terminals 23 during the read in signal, and hence there is no hole storage, no output current pulse and no output signal.

The use of the read in pulse allows a greater potential amplification to be obtained between the input signal potential $E_{14}$ and the output signal 203. The biasing batteries 12 and 28 provide sharp distinctions between the input and output conditions.

*FIGURE 6*

This figure illustrates a modification of the circuit of FIG. 1, which is useful as an AND circuit. This circuit includes three storage diodes 1, connected in series, and a separate signal input for each of the diodes. Each signal input comprises an input transformer 29 having a primary winding 30 and a secondary winding 31. The opposite ends of the primary winding 30 are connected to input terminals 32 and 33, the latter being grounded. The opposite ends of winding 31 are connected to the opposite terminals of one of the storage diodes 1. A signal of the proper polarity appearing at any one of the sets of input terminals 32, 33 results in the storage of minority carriers in the N-region of the associated diode 1. These three diodes 1 are connected in series in an output circuit which may be traced from an upper ground connection 34 through the three diodes 1 in series, the primary winding 35 of an output transformer 36 having a secondary winding 37, and thence through the secondary winding 38 of a sensing signal input transformer 39 having a primary winding 40. Primary winding 40 is connected to sensing signal input terminals 41 and 42. Output signal secondary winding 37 is connected to output terminals 43 and 44.

Figure 6:
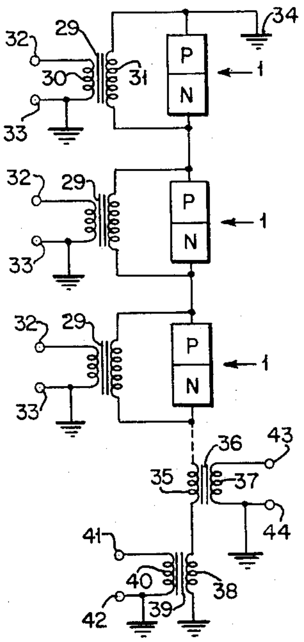
FIG. 6 is an electrical wiring diagram of a logical circuit embodying the invention.

*Operation of FIG. 6*

Signals received at the sensing signal input terminals 41, 42 have a polarity such that the potential induced thereby in the secondary winding 38 is poled to send current in the reverse direction through the diodes 1. If, when such a sensing signal is received, all three of the diodes 1 have received input signals during the lifetime of the minority carriers just preceding that sensing signal, then an initial current pulse will flow in the output circuit producing a signal at the terminals 43, 44. If, however, one of the sets of input terminals 32, 33 did not receive an input signal just prior to the sensing signal, then that diode 1 will remain in its high impedance condition and the sensing signal at terminals 41 and 42 will not be effective to send any substantial current flow through the output transformer primary winding 35, and no signal will appear at the output terminals 43 and 44.

The signals at various input terminals 32, 33 need not exactly coincide in time, as long as they all occur within one lifetime span of the minority carriers in the N-regions of the respective diodes. The circuit therefore may be termed a non-coincident multi-way AND circuit.

*FIGURE 7*

Figure 7:
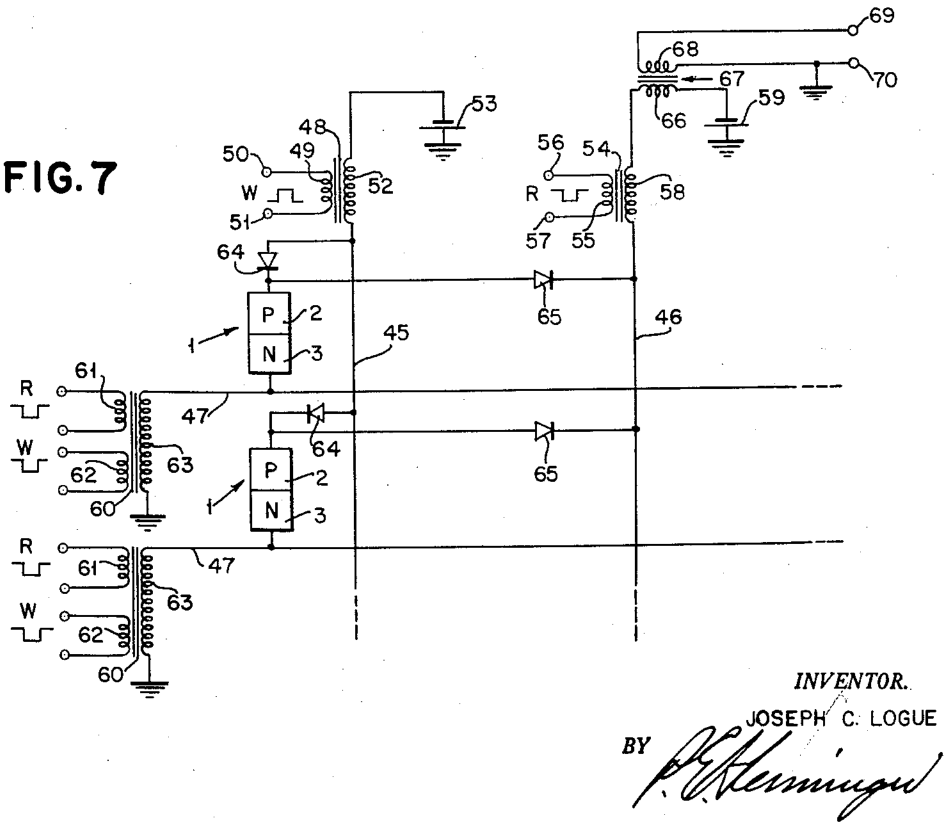
FIG. 7 is an electrical wiring diagram of a portion of a memory matrix using diodes as memory elements in accordance with the invention.

This figure illustrates a storage matrix using a plurality of diodes 1. Only two such diodes are shown in FIG. 7, these two comprising a fragment of a much larger matrix including a large plurality of storage units in an array of rows and columns. The two diodes 1 shown in FIG. 7 represent a portion of one column of such a matrix. Each column of the matrix is provided with a column write drive line 45 and a column read drive line 46. Each row of the matrix has a row drive line 47 which is used for driving during both the reading and writing phase of the storage operation.

Write signals are transmitted to the column write drive line 45 through an input transformer 48 having a primary winding 49 connected to input terminals 50, 51 and a secondary winding 52 connected in series with the column write drive line 45 and also in series with a biasing battery 53 whose opposite terminal is connected to ground.

The column read drive line 46 is supplied with signals through an input transformer 54 having a primary winding 55 connected to input terminals 56 and 57 and a secondary winding 58 connected in series with the column read drive line 46.

Also connected in series with the column read drive line 46 are a biasing battery 59 and the primary winding 66 of a signal output transformer 67 having a secondary winding 68 connected to output terminals 69 and 70.

The row drive lines 47 are each driven through a signal input transformer 60 having primary windings 61 and 62 and a secondary winding 63. Each secondary winding 63 is connected in series with the row drive line 47.

Each diode 1 has its N-region 3 connected to one of the row drive lines 47, and has its P-region 2 connected to its associated column write drive line 45 through a blocking diode 64 poled in the same sense as the diode 1. The P-region 2 is also connected to the column read drive line 46 through a blocking diode 65 poled in the opposite sense to diode 1.

*Operation of FIG. 7*

When it is desired to store information in one of the storage units comprising a particular diode 1 in the matrix of FIG. 7, input signals are simultaneously applied to the write signal input terminals 50, 51 for the column write drive line and to the input terminals for the primary winding 62 on the input transformer 60 or the associated row drive line. These signals produce in the secondary windings 52 and 63 potentials which aid each other in opposing the biasing battery 53 and sending a current in the forward direction through blocking diode 64 and storage diode 1, thereby storing minority carriers in the N-region 3. If, within the minority carrier lifetime, after the termination of the write signal inputs, read signals are applied to terminals 56, 57 and to the read input secondary winding 61, then potentials are developed in secondary windings 58 and 63 which tend to transmit a current through diode 1 in the reverse direction and through diode 65 in its forward direction. If carriers are stored in the N-region 3, a brief pulse of current initially flows when this read signal is applied, thereby producing an output signal in the transformer 67 and hence at the output terminals 69 and 70.

The various storage units in the matrix, each unit comprising a diode 1, may have data stored in them and read therefrom in sequence, in the manner conventional in such matrices.

Note that in the circuit of FIG. 7, the input and output pulses to each storage diode are isolated from each other's circuits by the blocking diodes 64 and 65, so that power amplification may be obtained by proper design of the input and output potentials and impedances.

Note, that the complete time for scanning of the storage matrix must not exceed the lifetime of the minority carriers in any one unit. The total writing and scanning time for the whole matrix may readily be made substantially less than that lifetime.

*FIGURE 8*

This figure illustrates a modification of the circuit of FIG. 1, in which power amplification is obtained by storing the minority carriers in a transistor rather than in a diode, so that the input and output loads are isolated from each other by the transistor structure.

Figures 8, 9, 10, 11, 12:
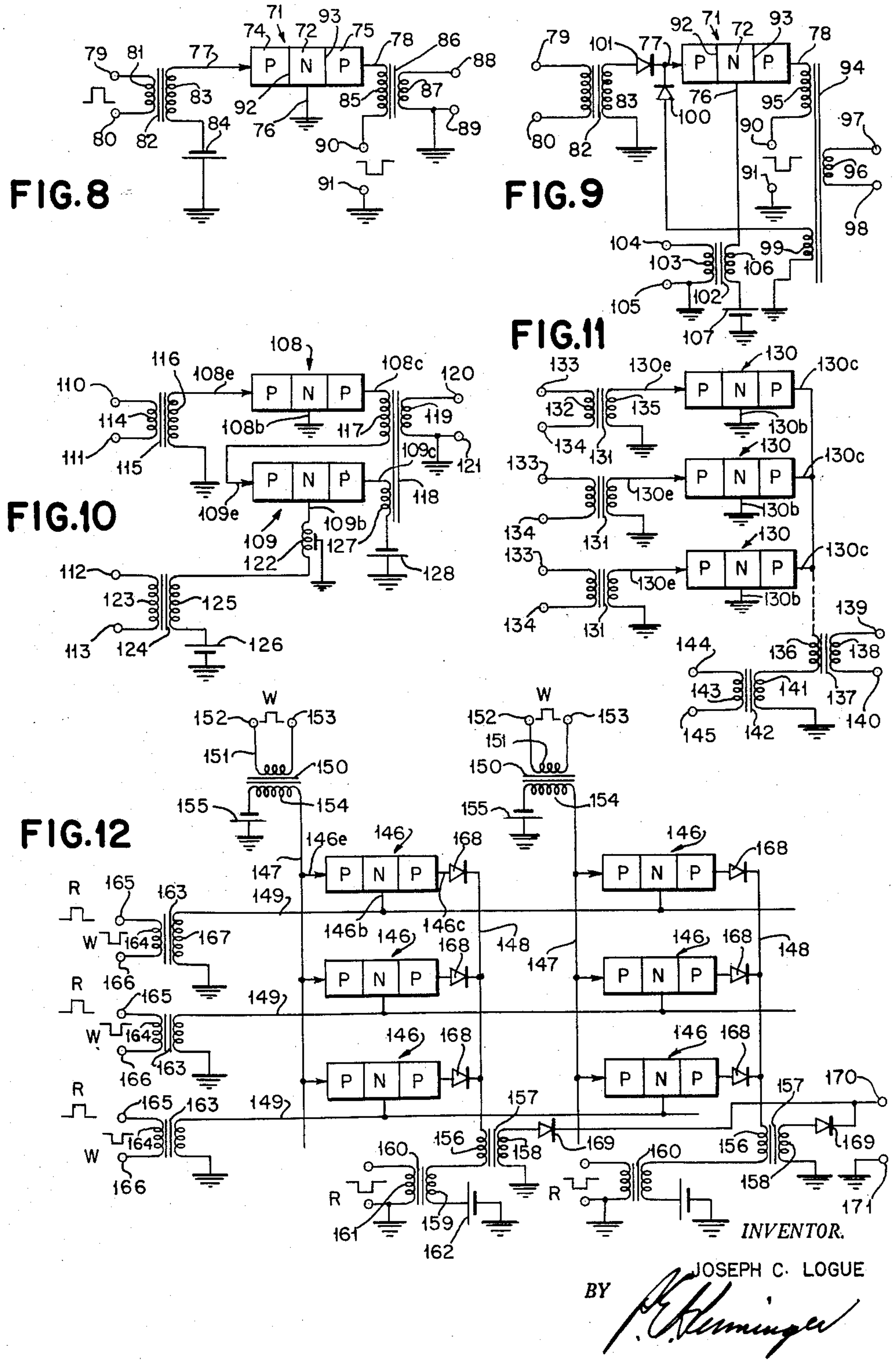
FIG. 8 is an electrical wiring diagram of a circuit usable as a logical circuit or as a power amplifier and utilizing a transistor for minority carrier storage in accordance with the invention.
FIG. 9 is an electrical wiring diagram of a trigger circuit employing minority carrier storage in accordance with the invention.
FIGS. 10 and 11 are electrical wiring diagrams of modified forms of logical circuits utilizing minority carrier storage in transistors in accordance with the invention.
FIG. 12 is an electrical wiring diagram of a memory matrix employing transistors as its memory units and utilizing minority carrier storage in accordance with the invention.

The minority carrier storage element in the circuit of FIG. 8 is a PNP junction transistor 71, including a central N-region 72 and left and right hand P-regions 74 and 75. The N-region 72 is provided with a ground connection 76 which serves as a base electrode for the transistor. The P-region 74 is provided with an electrical connection 77, which serves as an emitter connection. The P-region 75 is provided with an electrical connection 78 which serves as a collector connection.

Input signals are received in the circuit of FIG. 8 through input terminals 79 and 80, which are connected to the opposite ends of the primary winding 81 of an input transformer 82 having a secondary winding 83. Secondary winding 83 is connected in series with a biasing battery 84 and with the emitter connection 77 of the transistor 71. Collector connection 78 is connected to the primary winding 85 of an output transformer 86 having a secondary winding 87 connected to output terminals 88 and 89. Primary winding 85 is also connected in series with sensing signal input terminals 90 and 91.

The biasing battery 84 may in some cases be omitted, since with a transistor as connected in this figure, there is isolation between the output and input circuits. The biasing battery 84 does produce improved operation, however. For example, if the emitter is reverse biased by only a few tenths of a volt, then no minority carriers can be injected into the base region from the emitter. Note that the impedance of the base region internal to the transistor has the "off" collector current flowing through it. This tends to cause the emitter-base junction 92, or a portion of it, to be biased in the forward direction and hence to emit holes into the N-region 72. This is not unduly objectionable at ordinary temperatures, but the effect increases with temperature and may under high temperature conditions, cause confusion between the On and Off conditions at the output terminals. A small bias from a battery such as battery 84 prevents any such hole injection and allows the circuit to operate properly at elevated temperatures.

*Operation of FIG. 8*

When an input signal is received at terminals 79, 80 a current flows through secondary winding 83, emitter connection 77, P-region 74 and N-region 72, flowing in the forward direction through the junction 92 between those two regions, and emitting holes into the N-region 72. After the input signal terminates, these holes remain stored in the N-region 72 for the limetime of those minority carriers. If during that lifetime a sensing signal is applied between terminals 90 and 91, having a polarity to bias the PN junction 93 between N-region 72 and P-region 75 in the reverse direction, then the holes stored in the N-region 72 provide a current pulse which appears in primary winding 85 as an output signal pulse. A corresponding output signal appears at terminals 88 and 89.

If no input signal at terminals 79 and 80 precedes the sensing signal at terminals 90, 91, then no output signal is produced at terminals 88, 89.

Note that the output signal path through the N-region 72 does not involve the PN junction 92, but rather involves only the PN junction 93. Consequently, it is not necessary for the output signal current to charge the junction 92 to a potential equal and opposite to that of the biasing battery 84 before the current pulse can proceed. Therefore, the circuit of FIG. 8 has a power amplification which is determined by the relative impedances of the input and output loads.

As in the case of the circuit of FIG. 1, the circuit of FIG. 8 may be used as a non-coincident AND circuit, as a power amplifier, or for data storage.

*FIGURE 9*

This circuit is a modification of the circuit of FIG. 8 and is a bistable circuit providing a kind of trigger operation.

The circuit elements in FIG. 9 which are the same as those in FIG. 8 have been given the same reference numerals and will not be described in detail. The output transformer 86 of FIG. 8 is replaced in FIG. 9 by a signal output transformer 94 having a primary winding 95 connected in series with the collector 78 of transistor 71, a secondary winding 96 connected to output terminals 97 and 98, and another secondary winding 99 connected through a blocking diode 100 to the emitter 77 of transistor 71. Another blocking diode 101 is connected between input transformer secondary winding 83 and emitter 77.

Another input transformer 102, hereinafter termed the erase input signal transformer, has a primary winding 103 connected to input terminals 104, 105 and secondary winding 106 connected between the base 76 of transistor 71 and the positive terminal of a biasing battery 107 whose negative terminal is grounded.

*Operation of FIG. 9*

In the circuit of FIG. 9, the sensing input terminals 90, 91 are supplied with square wave signals having a frequency such that one-half the period of a cycle is slightly longer than the lifetime of the minority carriers in the N-region 72 of transistor 71. As long as no input signal appears at terminals 79, 80, then the PN junction 93 continues to present a hgih impedance to the sensing signals at terminals 90, 91 and substantially no output signal is produced at terminals 97, 98. If, however, an input signal is received at terminals 79, 80 during any interval between the sensing half cycles of the signal at terminals 90, 91, then that input signal at terminals 79, 80 will result in the storage of minority carriers in the 93 continues to present a high impedance to the sensing signal at terminals 90, 91, a current pulse will flow through winding 95, thereby producing an output signal at terminals 97, 98. At the same time, a feedback signal is induced in the winding 99 of the proper polarity to produce a further flow of current through junction 92 in the forward direction. The transformer action is effective to delay this current flow sufficiently so that the minority carriers stored thereby in the region 72 remain there until after the start of the succeeding sensing half-cycle. Consequently, on that succeeding half-cycle, another output signal is produced regardless of the fact that there has been no input signal at terminals 79, 80. The output signals continue to proceed from terminals 97, 98 on each successive sensing half-cycle, whether or not any further input signals are received at terminals 79, 80, until such time as an erase input signal is received at terminals 104, 105. The erase input signal raises the potential of the base, so that the signal fed back from winding 99 through diode 100 is not large enough to cause emitter current to flow. In short, the feedback loop is opened.

Winding 99 has a smaller number of turns than winding 95, so that a current step-up is achieved in the feedback loop. This arrangement permits the use of a junction transistor with a current gain less than unity.

An erase input signal terminates a continuing series of output signals. A new output series begins only when a new input signal is received at terminals 79, 80.

The operation of the circuit of FIG. 9 is analogous to that of a conventional bistable circuit, except that the output signal is oscillating in the On condition of the circuit rather than steady.

*FIGURE 10*

This circuit is a non-coincident AND circuit using transistors rather than the diodes of the circuit of FIG. 6 and including an arrangement for reshaping the output pulse.

The circuit of FIG. 10 uses two transistors 108 and 109, each of which is equivalent to the transistor 71 used in FIGS. 8 and 9. Transistor 108 has an emitter connection **108*e*, a base connection 108*b* and a collector connection 108*c*. Signals are supplied to the circuit of FIG. 10 through a first set of input terminals 110, 111 and a second set 112, 113. Input terminals 110, 111 are connected to the opposite ends of the primary winding 114 of a signal input transformer 115 having a secondary winding 116. One terminal of secondary winding 116 is grounded and the other terminal is connected to emitter connection 108*e***.

Transistor 109 has an emitter connection **109*e*, a base connection 109*b* and a collector connection 109*c*. Collector 108*c* is connected through primary winding 117 of an output transformer 118 to the emitter connection 109*e*. Output transformer 118 has a secondary winding 119 connected to output terminals 120, 121**.

Input terminals 112 and 113 are connected to the opposite ends of a transformer primary winding 123 of a transformer 124 having a secondary winding 125. Secondary winding 125 has one terminal connected through a delay line 122 to base **109*b* and has its opposite terminal connected through a biasing battery 126 to ground. Collector 109*c* is connected in series with a winding 127 on transformer 118 and thence through a load supply battery 128** to ground.

The delay line 122 is provided so that a common source of timing signals may be connected to both the input terminals 110 and 111 and the input terminals 112 and 113. The delay line 122 slows the pulse in the output circuit of transistor 108 sufficiently so that it occurs after the input pulse through the emitter of that transistor. Where synchronized sources of input pulses, separated in time, are used for input terminals 110 and 111 and for 112 and 113, then the delay line 122 may be omitted. Although the delay line 122 slows the pulse in the collector circuit of transistor 109, that delay is not objectionable.

*Operation of FIG. 10*

When an input signal of the proper polarity is received at terminals 110 and 111, holes are stored in the central N-region of transistor **108*b*. If within the lifetime of the stored holes, another input signal is received at terminals 112 and 113, then a current pulse flows from base 108*b* through collector 108*c*, primary winding 117, emitter 109*e*, base 109*b*, delay line 122, secondary winding 125, battery 126 and ground back to base 108*b*. Current flow through this circuit emits holes into the central N-region of the transistor 109. The current flowing through the winding 117 induces a current in winding 127, which is supplied by the holes in the N-region of transistor 109, accompanied by conventional transistor action at collector 109*c* of that transistor. A large current then flows through winding 127, producing a large output signal at the output terminals 120 and 121. The current flow through the winding 117 which is initiated by the potentials supplied by input signals 112, 113, determines the shape of the output pulse, although most of the power for the output pulse is supplied by winding 127**. Consequently, in addition to the AND circuit operation such as is obtained with the circuit of FIG. 8, the circuit of FIG. 10 provides a further amplification and a pulse reshaping function.

It should be obvious that the logical function (AND circuit operation) is not obtained in the circuit of FIG. 10 when a common source of signals is used for both input terminals 110, 111 and 112, 113, as suggested above. In such an arrangement, an input signal at terminals 110, 111 is always accompanied by a signal at terminals 112, 113. The only functions of the circuit are then amplification and signal pulse reshaping. On the other hand, when separate signal sources are used for the two sets of input terminals, the logical function is present, since signals must be supplied from both sources, in the proper timed relation, in order to produce an output signal.

*FIGURE 11*

This figure illustrates a multi-way OR circuit which uses hole storage for memory purposes. The circuit of FIG. 11 includes three transistors 130, which may be the same as the transistor 71 of FIGS. 8 and 9, each having an emitter connection **130*e*, a base connection 130*b* and a collector connection 130*c*. Each of the transistors 130 is supplied with input signals through an input transformer 131 having a primary winding 132 connected to input terminals 133, 134 and a secondary winding 135. The collectors 130*c* of the three transistors are connected in parallel to an output load circuit including in series the primary winding 136 of a signal output transformer 137 having a secondary winding 138 connected to output terminals 139 and 140. The secondary winding 141 of a sensing signal input transformer 142 is connected in series with the signal output transformer primary winding 136. The transformer 142 has a primary winding 143 connected to sensing input terminals 144 and 145**.

*Operation of FIG. 11*

The receipt of an input signal of proper polarity and magnitude at any of the sets of input terminals 133, 134 results in storage of holes in the N-region of the associated transistor 130. If within the lifetime of storage of such holes after the input signal terminals, a sensing input signal appears at terminals 144, 145, then a current flows through the output circuit including the collector **130*c* of that transistor where the holes were stored, primary winding 136 and secondary winding 141, thereby inducing a current in secondary winding 138 and producing an output signal at terminals 139, 140**.

Note that an output signal will be produced at terminals 139, 140 if an input signal is received at any of the three sets of input terminals 133, 134. This is typical OR circuit operation. Note also that the number of inputs is not limited to three but may be any convenient number.

*FIGURE 12*

This figure illustrates a memory matrix generally similar to that of FIG. 7, but employing transistors 146 instead of the diodes 1 of FIG. 7. There is shown in FIG. 12 only a portion of a complete matrix having a plurality of memory or data storage units in an array of columns and rows. There are illustrated two columns and three rows, making a total of six memory units including six transistors 146.

Each column is provided with a column write drive line 147 and a column read drive line 148. Each row is provided with a row drive line 149.

Write signals are supplied to the column write drive lines 147 through signal input transformers 150 having primary windings 151 connected to input terminals 152 and 153 and secondary windings 154 having one terminal connected to the column drive line and another terminal connected through a biasing battery 155 to ground.

Each column read drive line 148 is connected in series with the primary winding 156 of a signal output transformer 157 having a secondary winding 158, and with the secondary winding 159 of a read signal input transformer 160 having a primary winding 161. A biasing battery 162 is connected in series with the read input transformer 159 and the output signal transformer primary 156.

Each row drive line is supplied with signals through an input transformer 163 having a primary winding 164 connected to signal input terminals 165 and 166 and a secondary winding 167 connected in series with the row drive line 149.

Each of the transistors 146 has an emitter connection **146*e* connected to its associated column write drive line 147 a base connection 146*b* connected to its associated row drive line 149 and a collector connection 146*c* connected through a blocking diode 168 to its associated column read drive line 148**.

The secondary windings 158 of the several output transformers 157 are connected through blocking diodes 169 to a common output terminal 170. Another common output terminal 171 is connected to ground.

*Operation of FIG. 12*

In order to write or store a signal in any of the transistors 146, signals are simultaneously transmitted to its column drive line 147 and to its row drive line 149, both signals having polarities to aid each other in opposing the biasing battery 155 and potentials large enough to send a current through emitter **146*e* and base 146*b*, thereby storing holes in the N-region of the transistor 146. The signals may be stored consecutively in the respective transistors of the matrix in accordance with the usual method of operation of such storage matrices. When it is desired to read the data stored in the matrix, read impulses are supplied to each row drive line 149 and to each read signal input transformer 160 and thence to the column read drive line 148. These two signals are of the proper polarity to aid each other in transmitting a signal through the collector junction of the transistor 146 in the reverse direction and through the blocking diode 168, in its forward direction. If holes are stored in any of the central N-regions of the transistors of a column, then an output signal will be produced in the transformer 157, and will appear at output terminals 170, 171**.

While I have shown and described certain preferred embodiments of my invention, other modifications thereof will readily occur to those skilled in the art, and I therefore intend my invention to be limited only by the appended claims.

I claim:

1. A data storage device comprising a semiconductor body having at least one region of a predetermined extrinsic conductivity type, an asymmetrically conductive junction forming a boundary of said region, a signal input circuit including said junction, said region, and a source of electrical input pulses of unidirectional potention poled in the low impedance direction of said junction and operable during any of a first series of separated timed intervals to transmit current pulses through the junction in the low impedance direction thereof and thereby to inject minority carriers into said one region; a signal output circuit including said region and potential supply means operable, at times delayed, with respect to the termination of said intervals of said first series, by further intervals no greater than the lifetime of minority carriers in said region, to supply potential to said output circuit and thereby to produce a current flow having a magnitude dependent upon the existence of minority carriers in said region, and reverse biasing means connected across said junction and poled oppositely to said source, said reverse biasing means being effective when said first source is not transmitting a signal to collect minority carriers occurring in said region.

2. A data storage device as defined in claim 1, including a transistor having input, output and common electrodes, said body constituting the transistor body and said region being connected to said common electrode, said input circuit being connected to said input and common electrodes, and said output circuit being connected to said output and common electrodes.

3. A data storage device as defined in claim 1, in which said body is a diode having adjacent regions of opposite extrinsic conductivity types, said junction is the boundary junction between said regions, and said input circuit includes a blocking diode poled in the same sense as said junction and reversely biased by said reverse biasing means, said blocking diode being effective to prevent flow of current from said output circuit through said input circuit.

4. A data storage device as defined in claim 1, in which said current flow in the output circuit has an initial value relatively large if minority carriers remain stored in said region and relatively small if no minority carriers are stored, and delayed feedback means connecting said output circuit to said input circuit and effective upon said relatively large current flow in the output circuit to transmit a current through said input circuit in a direction to store minority carriers in said region during the following interval of said first series, so that an input signal applied to said input circuit at any interval of said first series results in a succession of output signals.

5. A data storage device as defined in claim 4, in which said feedback means comprises a transformer having a primary winding connected in series with said output circuit and a feedback winding connected in series with said junction to store minority current carriers in said region in response to each output signal.

6. A data storage device as defined in claim 4, including an erasing input means connected in series with said one region and operable to transmit through said one region a current effective to remove minority current carriers stored by said feedback means, and thereby to terminate said succession of output signals.

References Cited in the file of this patent

UNITED STATES PATENTS

| | | |
|---|---|---|
| 2,418,516 | Lidow | Apr. 8, 1947 |
| 2,565,497 | Harling | Aug. 28, 1951 |
| 2,592,683 | Gray | Apr. 15, 1952 |
| 2,627,575 | Meacham et al. | Feb. 3, 1953 |
| 2,629,834 | Trent | Feb. 24, 1953 |
| 2,644,892 | Gehman | July 7, 1953 |
| 2,644,893 | Gehman | July 7, 1953 |
| 2,644,897 | Lo | July 7, 1953 |
| 2,655,625 | Burton | Oct. 13, 1953 |
| 2,666,816 | Hunter | Jan. 19, 1954 |
| 2,695,398 | Anderson | Nov. 23, 1954 |
| 2,737,601 | McMahon | Mar. 6, 1956 |

(Other references on following page)

UNITED STATES PATENTS

| | | |
|---|---|---|
| 2,843,765 | Aigrain | July 15, 1958 |
| 2,854,651 | Kirher | Sept. 30, 1958 |
| 2,879,409 | Holt | Mar. 24, 1959 |

FOREIGN PATENTS

| | | |
|---|---|---|
| 160,213 | Australia | Dec. 10, 1954 |

OTHER REFERENCES

Kauke: "Negative Resistance in Germanium Diodes," April 1953 in Radio Electronic Engineering.

National Bureau of Standards Technical News Bulletin, vol. 38, No. 10, pp. 145–148, October 1954, article entitled Diode Amplifier.

UNITED STATES PATENT OFFICE

CERTIFICATE OF CORRECTION

Patent No. 3,070,779 December 25, 1962

Joseph C. Logue

It is hereby certified that error appears in the above numbered patent requiring correction and that the said Letters Patent should read as corrected below.

Column 4, line 16, for "impeadnce" read -- impedance --; column 5, line 10, for "battery $E_{28}$" read -- battery 28 --; column 8, line 5, for "limetime" read -- lifetime --; line 59, for "hgih" read -- high --; same column 8, lines 65 and 66, for "in the 93 continues to present a high impedance to the sensing" read -- in the N-region 72. On the next active half cycle of the sensing --; column 10, line 59, for "terminals" read -- terminates --.

Signed and sealed this 28th day of July 1964.

(SEAL)

Attest:

ESTON G. JOHNSON
Attesting Officer

EDWARD J. BRENNER
Commissioner of Patents